United States Patent [19]

Markley

[11] Patent Number: 4,867,200
[45] Date of Patent: Sep. 19, 1989

[54] UNIDIRECTIONAL FLUID FLOW CHECK VALVE ASSEMBLY

[76] Inventor: George L. Markley, 2091 Gano Rd., Montour Falls, N.Y. 14865

[21] Appl. No.: 213,680

[22] Filed: Jun. 30, 1988

[51] Int. Cl.⁴ ............................................. F16K 15/02
[52] U.S. Cl. ........................... 137/515.7; 137/516.15; 137/543.21
[58] Field of Search ................ 137/515, 515.7, 516.15, 137/543.19, 543.21, 454.2; 251/368

[56] References Cited

U.S. PATENT DOCUMENTS

| | | | |
|---|---|---|---|
| 1,356,298 | 10/1920 | Gregor | 137/512.1 |
| 1,359,006 | 11/1920 | Wardwell | 137/516.15 |
| 1,364,001 | 12/1920 | Shadduck | 137/515.7 X |
| 1,852,033 | 4/1932 | Summers | 137/515.7 X |
| 2,645,452 | 7/1953 | Lucas et al. | 251/368 X |
| 2,886,058 | 5/1959 | Horton | 137/540 X |
| 2,942,617 | 6/1960 | Gilliam | 137/515.7 X |
| 2,943,639 | 7/1960 | Smith | 137/515.7 |
| 3,119,410 | 1/1964 | Noecker | 137/516.15 X |
| 3,189,046 | 6/1965 | Callahn et al. | 137/515.7 |
| 3,749,122 | 7/1973 | Gold | 137/515.7 |
| 3,811,470 | 5/1974 | Schaefer | 137/515.7 X |
| 3,830,254 | 8/1974 | Harrewijne et al. | 137/540 |
| 4,531,543 | 7/1985 | Markley | 137/515.7 |
| 4,532,958 | 8/1985 | Napolitano | 137/454.2 |

FOREIGN PATENT DOCUMENTS 1001071  1/1957  Fed. Rep. of Germany ... 137/515.7

Primary Examiner—John Rivell
Attorney, Agent, or Firm—Cislo & Thomas

[57] ABSTRACT

A unidirectional fluid flow check valve assembly is ideally suited for controlling gaseous fuel flow to pre-combustion chambers of internal combustion engines. The unidirectional fluid flow check valve assembly has an orifice plate having a center orifice biased against a valve seat by a spring. The valve seat has a plurality of ports unaligned with the orifice. A valve plate is held in confrontational relationship with the orifice plate and has a center port aligned with the orifice. The valve plate is sized and positioned to allow the orifice plate to move between the valve plate and the valve seat. All of the valve components can be assembled within a receptacle end of a male inlet housing. The inlet housing can then be threaded into a female outlet housing, forming a valve chamber therebetween. The combination of elements provides a valve that is easy to assemble, does not need valve seals, and prevents the orifice plate from floating during low pressure situations.

18 Claims, 1 Drawing Sheet

UNIDIRECTIONAL FLUID FLOW CHECK VALVE ASSEMBLY

BACKGROUND OF THE INVENTION

This invention relates to check valves, particularly unidirectional fluid flow valves useful for admitting fuel into combustion chambers of internal combustion engines. In particular, the invention may be used to admit fuel into pre-combustion chambers. For this application such a valve replaces a fuel injection valve and utilizes the pressure differential between a pre-combustion chamber and a pre-combustion chamber fuel manifold of an engine to meter and control the fuel injection timing thereof.

For a more complete discussion of these valves incorporated by reference is U.S. Pat. No. 4,531,543 issued July 30, 1985 to George L. Markley. Use of the invention as disclosed and claimed in the above U.S. patent is effective, except that the invention makes use of a valve element defining an orifice, which may occasionally fail to or may not operate smoothly. This is because of a stickiness between a valve housing and the element due to moisture build-up and/or cocking of the element within the valve.

Also, during certain times of the engine cycle, when there is little or no pressure differential between the inlet of the valve and the communicating adjacent pre-combustion chamber, the valve element tends to float. Such a phenomenon allows low volume fluid flow in either direction at a time when the valve would preferable be closed. Fuel flow toward the pre-combustion chamber (or power cylinder) at this time decreases the exactness of fuel admission control. Flow away from the pre-combustion chamber would likely contain gases contaminated by combustion particles that would foul the clean valve seat, raise the valve temperature, and displace fuel gas in the supply line effecting the next admission cycle.

It has also been found that the use of certain seals required within the preferred embodiment of the disclosed patented invention as aforecited adds certain volumes of space within the valve. This space contributes to the volume of heated gases compressed within the valve during the combustion cycle which increases the valve's temperature. Other undesirable features of the seals are additional assembly time, extra cost, and occasional failure. Finally, for proper operation, one of these seals must be thinner than the valve element, thereby limiting how thin, lightweight, and flexible the valve element can be made. These parameters may effect the responsiveness of the valve.

Furthermore, assembly of the valve disclosed in the above-referenced patent prove difficult as the internal components of the valve have to be critically positioned with the valve housing. The numerous valve components, when being positioned within the valve housing annoyingly hang up on threading within the valve housing and become disoriented. Therefore, extra labor and tools are needed to insure that the components are properly aligned when assembled.

There is substantial interest in the area of valve manufacture and use to develop a unidirectional fluid flow check valve assembly which avoids the abovementioned problems.

The features identified above as being desired for a unidirectional fluid flow check valve assembly are all provided by the present invention.

SUMMARY OF THE INVENTION

The present invention is embodied in an improved unidirectional fluid flow check valve assembly. The valve, by its construction, avoids having to use certain seals which would otherwise add to the volume into which hot combustion gases could be compressed. Furthermore, the valve uses a light spring to positively insure a positive opening and closing action, keeping the valve from sticking in any one position. Also, the spring eliminates undesirable floating effects of the valve element defining the orifice. Finally, the valve is easily assembled as all of the internal valve components can be nested within an unthreaded housing before final assembly.

In more detailed aspects of the invention, the assembly comprises a circular valve seat having a disc shape and a plurality of ports therethrough and having an annular groove on one side connecting the ports. A movable orifice plate having a disc shape with a diameter smaller than the valve seat, and having an orifice therethrough is held in adjacent confrontational relationship with the valve seat's grooved side. The annular groove and the ports of the valve seat are not aligned with the orifice of the orifice plate.

Additionally, a valve plate having a port therethrough is held in adjacent confrontational relationship to the orifice of the orifice plate. The port of the valve plate is axially aligned with the orifice of the orifice plate to permit fluid flow therethrough. The valve plate has a raised circular lip around the port and located so as to be in confrontational relationship with the orifice plate.

The valve plate has a circular outer shoulder of a height greater than the inner shoulder to allow the orifice plate to be positioned within the outer shoulder. This configuration also keeps the valve seat positioned within the outer shoulder. The ports of the valve seat are concentrically aligned within the inner diameter of the outer shoulder. The orifice plate may move between the valve plate and the valve seat depending upon the flow through the valve.

A spring of a predetermined resilience is interposed between the orifice plate and the valve plate. The spring biases the orifice plate against the valve seat to prevent floating and insure positive opening and closing of the valve.

An inlet housing allows fluid flow communication therethrough and has a first end defining a receptacle. The receptacle is for receiving and holding the valve seat, the orifice plate, the spring and the valve plate in their respective confrontational relationships. This allows the components of the valve to be easily assembled and manufacturing control of surface flatness eliminates the need for seals.

An outlet housing allows fluid flow communication therethrough and defines a complementary receptacle for receiving and holding the first end of the inlet housing, thereby forming a valve chamber therebetween.

Other aspects and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
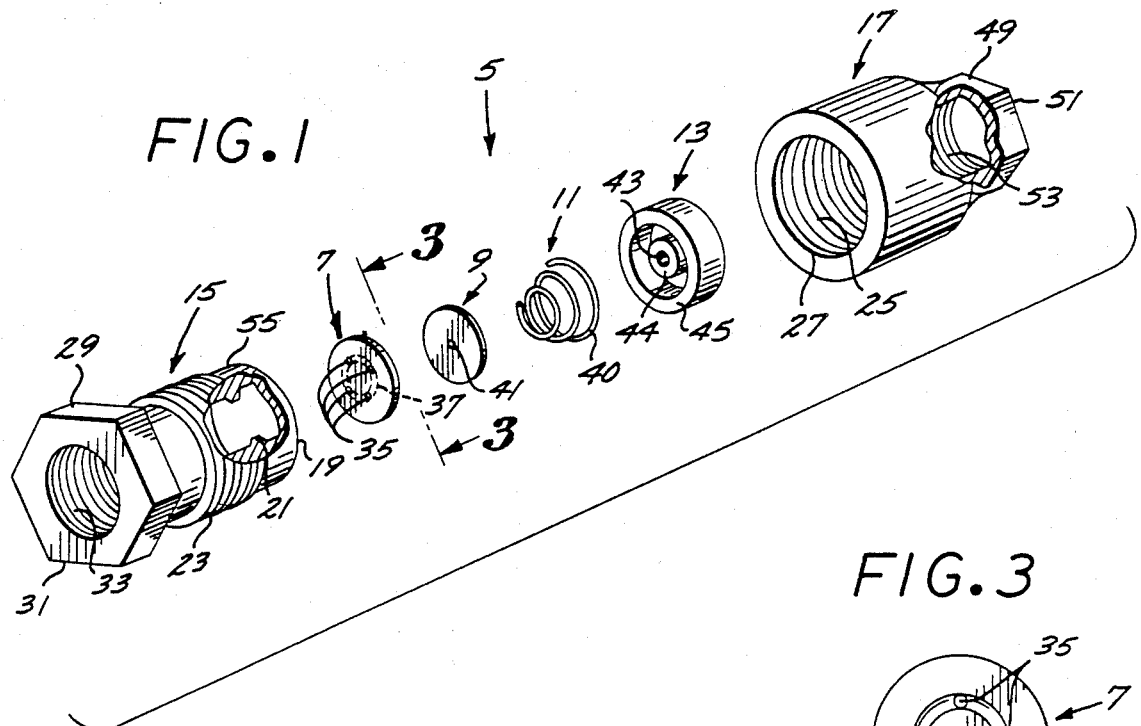
FIG. 1 is an exploded right perspective view of an improved unidirectional fluid flow check valve assembly of the present invention with cutaways shown on the end components for purposes of clarity and a circumferential groove shown in phantom.

As shown in the drawings, the invention is embodied in a unidirectional fluid flow check valve assembly 5 of the kind used to regulate fluid flow into combustion chambers, preferably pre-combustion chambers, (not shown) of internal combustion engines. The assembly 5 includes a circular valve seat 7, a movable orifice plate 9, a helical spring and a valve plate 13——all held in confrontational, cooperative and assembled relationship within a male inlet housing 15 and a female outlet housing 17. The male and female housing 15 and 17 will be described more fully after the components held between the housings are more fully described.

The orifice plate 9 moves between the valve seat 7 and valve plate 13 allowing fluid flow only in one direction. The spring 11 biases the orifice plate 9 against the valve seat 7 preventing fluid flow through the assembly 5 in a low pressure condition. A low pressure condition is when the pressure in the pre-combustion chamber (not shown) is about equal to the pressure sensed at the inlet housing 15, yet it is desirable to ensure the valve is in a closed or checked mode. This effectively prevents contaminated fluid leakage into the fuel supply line (not shown), past the orifice plate 9, and the valve seat 7, which remain clean and sealable in the checked mode.

During assembly of the unidirectional fluid flow check valve assembly 5, the valve seat 7, orifice plate 9, spring 11 and valve plate 13 can be easily placed within the cylindrical inlet housing 15 without having to use standard seals or washers (not used in this invention). The inlet housing 15 is inserted within the outlet housing 17, thereby forming a valve chamber 12 between both housings in which to hold the other assembly components.

In accordance with the present invention, and as shown in FIG. 1, the inlet housing 15 has a male mating end 19. Positioned a predetermined distance within the mating end 19 is a shoulder 21 sized to support the valve seat 7, yet allow fluid flow communication through the valve inlet housing 15. The inlet housing 15 has exterior threading 23 to engage complementary threading 25 within the inner surface 27 of the outlet housing 17. Wrenching flats 29 on the wrenching end 31 of the inlet valve 15 allow use of a wrench to rotate the inlet valve 15 into and out of the outlet housing 17. Internal threading 33 within the inlet housing 15 at the wrenching end 31 allows connection with a fuel line or manifold of the engine.

The valve seat 7 has a disc shape and is sized to be received within the inlet housing 15, but is of greater diameter than the shoulder 21 within the inlet housing 15. A plurality of uniformly spaced ports 35 allow fluid flow through valve seat 7.

The ports are spaced along a diameter smaller than the inner diameter of the shoulder 21 of the inlet housing 15. This allows fluid flow through the inlet housing, past the shoulder 21, and through the ports 35 of valve seat 7.

The uniform spacing of ports 35 also insures that the valve assembly 5 operates properly as the force of fluid flow through the ports 35 is uniformly distributed against the orifice plate 9.

Figure 3:
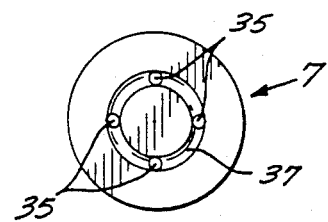
FIG. 3 is a view taken along the line 3—3 of the orifice plate of the present invention as shown in FIG. 1.
Figure 2:
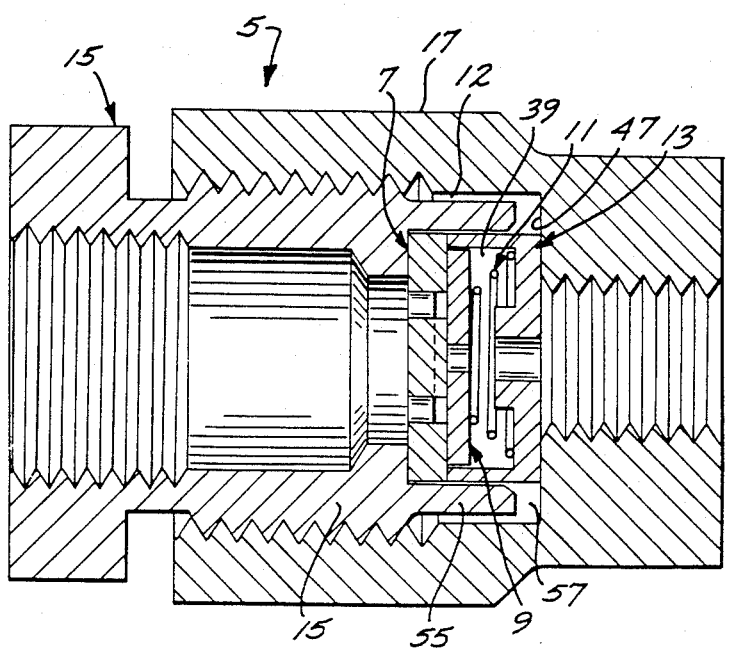
FIG. 2 is a side, cross sectional view of the improved unidirectional fluid flow check valve assembly of the present invention.

As shown in FIG. 1, in phantom, FIG. 2 and FIG. 3, a circumferential groove 37 is located on the side of the valve seat 7 facing the orifice plate 9. The groove 37 allows depression around each port to further distribute the force of fluid flow over an area defined by the width and circumference of the groove 37. Therefore, the fluid force created by entering fluid, uniformly pushes against the orifice plate 9 as the fluid flows through the ports 35 filling the groove 37 of the valve seat 7.

The orifice plate 9 is smaller in diameter than the valve seat 7 and has a disc shape. The orifice plate 9 is thin and has an orifice 41 of a predetermined size and centered through the orifice plate 9. When assembled the orifice plate 9 can slideably move between the valve seat 7 and the valve plate 13. However, when assembled the orifice plate 9 is bound within a chamber 39 between the valve seat 7 and the valve plate 13. The orifice plate 9 can freely move within this chamber 39, but for the spring 11 which biases the orifice plate 9 against the valve seat 7.

The spring 11 shown in this embodiment is a coiled type of a predetermined tension to normally bias and retain the orifice plate 9 against the valve seat 7 until a sufficient fluid force through the ports 35 of the valve seat 7 overcomes the tension force of the spring 11. Therefore, the spring 11 biases the orifice plate 9 in a closed position. Other types of springs than the one shown can be similarly used. For this embodiment, a spring 11 having a load compression of 0.035/0.025 lbs at 0.028 inches will suffice. The spring 11 also has a wider end 40 sized to be held by the valve plate 13, engaging the valve plate 13.

Fluid cannot flow through the orifice 41 of the orifice plate 9 because the spring 11 holds the orifice plate 9 against the valve seat 7 blocking fluid flow. Only fluid pressure from the inlet housing 15 sufficient to overcome the tension of the spring 11 can push the orifice plate 9 away from the valve seat 7 exposing the orifice 41 and allowing fluid to flow therethrough. However, fluid pressure from the outlet housing 17 no matter how great, cannot separate the orifice plate 9 from the valve seat 7 to allow fluid flow through the orifice 41. Fluid pressure from the outlet housing 17 pushes against the orifice plate 9 preventing the separation of the orifice plate 9 and the valve seat 7, thereby blocking fluid flow.

The valve plate 13 has a disc shape sized to be received within the mating end 19 of the inlet housing 15. The valve plate 13 has a center port 43 surrounded by an inner raised shoulder 44 which is circular. The shoulder 44 is located on the side of the valve plate 13 directly opposing the orifice plate 9. The center port 43 is aligned with the orifice 41 of the orifice plate 9. Therefore, when the orifice plate 9 moves away from the valve seat 7, fluid can flow through the ports 35 of the valve seat 7, through the orifice 41 and through the center port 43 of the valve plate 13.

The valve plate 13 has an outer raised shoulder 45 which is circular and of sufficient diameter to receive the orifice plate 9, but small enough to abut against the valve seat 7. The region 39 formed therebetween is of sufficient size to hold the orifice plate 9 and the spring 11, and permit sufficient movement of the orifice plate 9 between the inner raised shoulder 44 of the valve plate 13 and the valve seat 7. The wider end 40 of the spring 11 fits between the valve plate's inner and outer raised shoulders 44 and 45, respectively.

The outlet housing 17 in conjunction with the inlet housing 15 holds the valve components together in operational confrontational relationship when assembled. The outlet housing 17 is cylindrical and has an inner shoulder 47 sized to support the valve plate 13 yet, allowing fluid communication through the housing 17. Like the inlet housing 15, the outlet housing 17 has wrenching flats 49 at its non-mating end 51. The outlet housing also has internal threading 53 as shown in the cutaway of FIG. 1 for interconnection to other piping or a combustion chamber.

The components of the present invention are very easily assembled. The inlet housing 15 is held in an upright position, its mating end 19 up. The valve seat 7 is placed on the shoulder 21 of the inlet housing 15 with its groove side up. The orifice plate 9 is put on top of the valve seat 7 within the inlet housing 15. The spring 11 is placed on top of the orifice plate, its wide end 40 up. The valve plate 13 can be placed on top of the spring 11, its inner and outer raised shoulders 44 and 45 engaging the wide end of the spring 1. Finally, the inlet housing 15 holding the above components can be rotatively threaded into the female outlet housing 17.

The inlet housing 15 can be rotatively tighted to hold the components tightly, thereby forming the chambers 12 and 39. The mating end 19 of the inlet housing 15 has a predetermined length 55 extending beyond the shoulder 21 of the housing 15. Therefore, when assembled with the outlet housing 17, a chamber 57 is formed. Because of the chamber 57 the inlet housing can be greatly tightened against the components therebetween forming a fluid tight seal.

Because the surface flatness of all the component surfaces can be controlled to high tolerances, the design of the present application does not require valve seals which burn up, are difficult to assemble and take up space within the valve.

The components of the present invention may be made of various materials. In the presently described embodiment, the inlet housing 15, valve seat 7, valve plate 13, and outlet housing 17 are made of precipitation hardening stainless steel. This material is chosen in this embodiment as the components are exposed to high stresses, high temperatures and highly corrosive combustion gases. Therefore, to insure operability and durability, a material such as precipitation hardening stainless (17-4 pH—Carpenter Custom 450 or Carpenter 455) is desirable. The spring 11 is made of 302 SST with a thin copper coating, to aid manufacturing, for the present choice. The orifice plate is made of aluminum 2011-T3 which seems to work well, and is lightweight and non-magnetic (both are desirable characteristics). High temperature and strength plastics now available hold considerable promise. The non-magnetic materials resist magnetization which can occur due to the proximity to a spark ignition system and deleteriously effects the operation of the valve.

It should be appreciated from the foregoing description that the present invention provides a unidirectional fluid flow check valve assembly which is easily assembled, does not require the use of valve seals, prevents orifice plate floating problems, is extremely fast acting, is durable enough for withstanding high temperatures and corrosive environments appurtenant to an internal combustion chamber of an engine, and the operation of which is not affected by magnetism, electrical fields and/or its assembled position.

Although the present invention has been described in detail with reference only to the presently-preferred embodiment, it will be appreciated by those of ordinary skill in the art that various modifications can be made without departing from the invention. Accordingly, the invention is limited only by the following claims.

I claim:

1. A unidirectional fluid flow check valve assembly comprising:
   (a) a circular valve seat having a disc shape and having a plurality of ports therethrough;
   (b) a movable orifice plate having a disc shape, a diameter smaller than said valve seat, and having an orifice therethrough, and held in confrontational relationship with said valve seat such that said ports of said valve seat are non-aligned axially with said orifice of said orifice plate;
   (c) a valve plate held in confrontational relationship with said orifice plate, having a port therethrough, said port being axially aligned with said orifice of said orifice plate, and wherein said valve plate has an inner shoulder around said port located so as to be in confrontational relationship with said orifice plate, wherein said valve plate has an outer shoulder of a height greater than said inner shoulder and an inner diameter sized to allow said orifice plate to be positioned within said outer shoulder, and wherein said ports of said valve seat are concentrically aligned within said inner diameter of said outer shoulder, allowing said orifice plate to move between said valve plate and said valve seat depending upon flow through the valve;
   (d) a spring of predetermined resilience interposed between said orifice plate and said valve plate, biasing the orifice against said valve seat;
   (e) a male housing allowing fluid communication therethrough and having a first end defining a receptacle a portion of which is unthreaded for receiving and holding said valve seat, said orifice plate, said spring and said valve plate in their respective confrontational relationships; and
   (f) a female housing allowing fluid communication therethrough and defining a complementary receptacle for receiving and holding said first end of said male housing, and thereby forming a valve chamber therebetween, wherein said first end of said male housing interfaces said female housing receptacle allowing a variable space between said male and said female housing, and wherein said first end of said male housing extends a length shorter than the depth of said female housing receptacle.

2. A unidirectional fluid flow check valve assembly of claim 1, wherein threading on the exterior of said male housing engage threading on the interior of said female housing.

3. A unidirectional fluid flow check valve assembly of claim 2, wherein said male and said female housings have wrenching flats on their exterior for gripping and rotating said housings.

4. A unidirectional fluid flow check valve assembly of claim 3, wherein said ports are uniformly spaced about the center axis of said valve seat.

5. A unidirectional fluid flow check valve assembly of claim 4 wherein said valve seat has depressions around said ports.

6. A unidirectional fluid flow check valve assembly of claim 5 wherein said depressions are interconnected by a circumferential groove.

7. A unidirectional fluid flow check valve assembly of claim 6, wherein said valve plate, said orifice plate, said spring and said female housing are made of stainless steel.

8. A unidirectional fluid flow check valve assembly comprising:
   (a) first means defining a circular valve seat;
   (b) second means defining a circular valve plate;
   (c) third means defining a circular orifice element having a given outside diameter, confined between said first and second means and movable between said first and second means, and formed of material that is very thin, lightweight, and resistant to temperatures in excess of 100° F.;
   (d) fourth means defining a biasing means for biasing said third means against said first means, wherein said third means is held against said first means; and
   (e) fifth means for holding and sealing said first, second, third and fourth means in axial alignment, wherein said first means is held in a mutually confrontational relationship with said third means, said third means is held in a mutually confrontational relationship with said fourth means and said fourth means is held in a mutually confrontational relationship with said second means; wherein said fifth means defines a cylindrical, fluid-sealed chamber therebetween in cooperation with said first, second, third and fourth means, wherein said fifth means can be adjusted by rotation to vary the space within said chamber, thereby affectuation a more secure seal after repeated exposure to changing temperatures.

9. A unidirectional fluid flow check valve assembly of claim 8, wherein said fifth means further comprises a male housing having a first end and a female housing having a receptacle, wherein said first, second, third and fourth means can be assembled within said male housing which can be inserted and held with said receptacle of said female housing and wherein said first end of said male housing extends a length shorter than the depth of said female housing receptacle.

10. A unidirectional fluid flow check valve assembly of claim 9, wherein said first means further defines uniformly spaced ports therethrough, wherein said second means defines a centered port therethrough, and having an inner raised shoulder surrounding said port, and an outer raised shoulder surrounding said inner shoulder allowing said fourth means to be held between said shoulders while biasing said third means against said first means, and wherein said inner shoulder is of lesser height than said outer shoulder.

11. A unidirectional fluid flow check valve assembly of claim 10, wherein said first means is made of a non-magnetic material.

12. A unidirectional fluid flow check valve assembly comprising:
   (a) A circular valve seat having a disc shape and having a plurality of ports therethrough;
   (b) a movable orifice plate having a disc shape, a diameter smaller than said valve seat, and having an orifice therethrough, and held in confrontational relationship with said valve seat such that said ports of said valve seat are non-aligned axially with said orifice of said orifice plate;
   (c) a valve plate held in confrontational relationship with said orifice plate, having a port therethrough, said port being axially aligned with said orifice of said orifice plate, and wherein said valve plate has an inner shoulder around said port located so as to be in confrontational relationship with said orifice plate, wherein said valve plate has an outer shoulder of a height greater than said inner shoulder and an inner diameter sized to allow said orifice plate to be positioned within said outer shoulder, and wherein said ports of said valve seat are concentrically aligned within said inner diameter of said outer shoulder, allowing said orifice plate to move between said valve plate and said valve seat depending upon flow through the valve;
   (d) a spring of predetermined resilience interposed between said orifice plate and said valve plate, biasing the orifice against said valve seat;
   (e) a male housing allowing fluid communication therethrough and having a first end defining a receptacle for receiving and holding said valve seat, said orifice plate, said spring and said valve plate in their respective confrontational relationships, wherein said receptacle of said male housing is unthreaded; and
   (f) a female housing allowing fluid communication therethrough and defining a complementary receptacle for receiving and holding said first end of said male housing, and thereby forming a valve chamber therebetween, and wherein said first end of said male housing extends a length shorter than the depth of said female housing receptacle.

13. A unidirectional fluid flow check valve assembly of claim 12, wherein threading on the exterior of said male housing engage threading on the interior of said female housing.

14. A unidirectional fluid flow check valve assembly of claim 13, wherein said male and said female housings have wrenching flats on their exterior for gripping and rotating said housings.

15. A unidirectional fluid flow check valve assembly of claim 14, wherein said ports are uniformly spaced about the center axis of said valve seat.

16. A unidirectional fluid flow check valve assembly of claim 15, wherein said valve seat has depressions around said ports.

17. A unidirectional fluid flow check valve assembly of claim 16, wherein said depressions are interconnected by a circumferential groove.

18. A unidirectional fluid flow check valve assembly of claim 17, wherein said valve plate, said orifice plate, said spring and said female housing are made of stainless steel.

* * * * *